(12) United States Patent
Feng et al.

(10) Patent No.: US 12,461,988 B1
(45) Date of Patent: Nov. 4, 2025

(54) ADAPTIVE MODEL UPDATING ALGORITHM FOR PROBABILISTIC ANALYSIS OF COMPLEX ENGINEERING STRUCTURES

(71) Applicant: Southeast University, Suzhou (CN)

(72) Inventors: Decheng Feng, Suzhou (CN); Yuxiao Wu, Suzhou (CN)

(73) Assignee: Southeast University, Jiangsu (CN)

( * ) Notice: Subject to any disclaimer, the term of this patent is extended or adjusted under 35 U.S.C. 154(b) by 0 days.

(21) Appl. No.: 19/051,126

(22) Filed: Feb. 11, 2025

(30) Foreign Application Priority Data

Sep. 2, 2024 (CN) .......................... 202411216622.8

(51) Int. Cl.
*G06F 17/18* (2006.01)
*G06F 17/16* (2006.01)
*G06F 30/23* (2020.01)
*G06Q 50/08* (2012.01)

(52) U.S. Cl.
CPC .............. *G06F 17/16* (2013.01); *G06F 17/18* (2013.01); *G06F 30/23* (2020.01); *G06Q 50/08* (2013.01)

(58) Field of Classification Search
CPC ....... G06N 7/01; G06F 30/20; G06F 2111/08; G06F 2111/10; G06F 17/16; G06F 17/18
See application file for complete search history.

(56) References Cited

FOREIGN PATENT DOCUMENTS

| | | | | |
|---|---|---|---|---|
| CN | 111291481 A | * | 6/2020 | ....... G06F 18/24155 |
| CN | 114896564 | | 8/2022 | |
| CN | 115081326 | | 9/2022 | |
| CN | 116050208 | | 5/2023 | |
| CN | 117521202 | | 2/2024 | |

* cited by examiner

*Primary Examiner* — Matthew D Sandifer
(74) *Attorney, Agent, or Firm* — JCIPRNET (57) ABSTRACT

Disclosed is an adaptive model updating algorithm for probabilistic analysis of complex engineering structures. The method involves determining parameter distribution, sampling based on prior distribution, calculating likelihood values, and adaptively updating coefficients. Iterations include calculating a covariance matrix, generating intermediate parameters, and sampling candidate values for acceptance. Iterations continue until a stop condition is met, yielding the posterior parameter distribution. This algorithm enhances health detection in complex structures by overcoming prior limitations such as inefficient coefficient determination and suboptimal likelihood functions, significantly reducing calculation time and improving efficiency.

12 Claims, 4 Drawing Sheets

ADAPTIVE MODEL UPDATING ALGORITHM FOR PROBABILISTIC ANALYSIS OF COMPLEX ENGINEERING STRUCTURES

CROSS-REFERENCE TO RELATED APPLICATION

This application claims the priority benefit of China application serial no. 202411216622.8, filed on Sep. 2, 2024. The entirety of the above-mentioned patent application is hereby incorporated by reference herein and made a part of this specification.

BACKGROUND

Technical Field

The present invention relates to the technical field of model structure parameter inversion and, in particular, to an adaptive model updating algorithm for probabilistic analysis of complex engineering structures.

Description of Related Art

It is a cost-effective and reliable way to invert parameters from test data of complex engineering structures to detect their health, which has great guiding significance for safety assessment of complex structures. Complex engineering structure refers to large-scale and complex engineering structures, such as high-rise and super-high-rise structures, long-span bridges and nuclear power plants. Due to the large structure and various components of complex engineering structures, it will also cost a lot of time and money to use scaled model for testing. In addition, when studying the safety of complex engineering structures, it is generally necessary to load the model structure to the failure, and the established model can only obtain a set of structural failure data. If you want to repeat the test, it is a huge requirement for human, material and financial resources. As a result, it is very difficult to deduce the parameter values of complex engineering structures completely through tests, and it is difficult to promote the research on the health detection of complex engineering structures. Besides, there are many parameters that need to be determined in complex engineering structures. Some material parameters can be determined by material property tests, while many more parameters cannot be determined by experiments or specifications. Because of the uncertainty caused by the parameters themselves, measurement errors and environmental conditions, it is more difficult to determine the parameters of complex engineering structures, and it is necessary to consider the uncertainty of parameters when analyzing complex engineering structures. Finally, if the finite element method and parameter inversion analysis method are used to establish a complex engineering structure model for parameter inversion analysis, the calculation time of model parameter inversion and the adaptability of the method to the complex engineering model need to be considered. Therefore, how to establish a small amount of data-driven and highly adaptive model updating method for complex engineering structures is an important step to solve the parameter inversion and health detection of complex engineering structures.

Bayesian model parameter updating method is one of the most popular model parameter updating methods. It is a model parameter updating method based on Bayesian theory and Markov Chain Monte Carlo (MCMC) sampling algorithm. Since the 21st century, Bayesian model parameter updating algorithm and finite element model have been widely used in model parameter inversion and health detection. The most popular Bayesian model parameter updating method is the Metropolis-Hastings (M-H) sampling algorithm. Due to the limitations of M-H sampling algorithm, some new and improved algorithms have been proposed, such as the Transitional MCMC (TMCMC) algorithm, Delayed Rejection-MCMC (DR-MCMC) algorithm, and Adaptive Metropolis-MCMC (AM-MCMC) algorithm. However, these algorithms all have certain limitations. Firstly, the calculation method of likelihood function is not suitable for different models, which leads to the need to search for a suitable form of likelihood function every time the algorithm is applied to a new model. Secondly, the reasonable values of some algorithm coefficients in the algorithm cannot be found adaptively, which leads to the need to spend a lot of time debugging these coefficients in the algorithm. Finally, the problem of long finite element calculation time is not considered. In these algorithms, the optimal algorithm coefficients needs to be obtained by multiple iterations. These algorithms may be suitable for models with short iteration time each time, but are not applicable if it takes long time for each iteration.

SUMMARY

Objective of invention: The present invention is intended to provide an adaptive model updating algorithm for probabilistic analysis of complex engineering structures.

Technical solution: the present invention comprises the following steps:

1) setting the iteration stage of the algorithm as i, the number of iterations each stage as $N_s$, difference constant as c, exponential constant as $\alpha$, likelihood function as g, the important parameter matrix of a model as $\theta=[\theta_1, \theta_2, \ldots, \theta_{ii}, \ldots, \theta_n]$, where ii=1,2, ..., n, $\theta_{ii}$ is important parameter ii, the prior distribution of model parameters as $\pi(\theta)$, the number of measuring points as Ny and a measuring point response matrix of test as $Y=[y_1, y_2, \ldots, yj_j, \ldots, y_{Ny}]$ where jj=1, 2, ..., $N_y$, $y_{jj}$ is response of measuring point jj, and $q_0=0$;

(2) setting i=1, randomly sampling $N_s$ prior parameter matrices $0=[\theta^{(1)}, \theta^{(2)}, \ldots, \theta^{(j)}, \ldots, \theta^{(Ns)}]$, where j=1, 2, ..., $N_s$, $\theta^{(j)}$ is prior parameter matrix j, from the prior distribution $\pi(\theta)$ of model parameters, and calculating the likelihood values of corresponding model prior parameters;

(3) calculating the variance constant $C_{cov}$, $q_i$ and the maximum difference $C_{max}$, as well as the likelihood weight coefficient $w_{(i,j)}$ of each set of prior parameter values under total iteration i and the mean value $S_i$ of weight coefficient;

(4) calculating the variance matrix $\Sigma_i$ of the proposal distribution;

(5) generating an intermediate model parameter matrix $\theta^c=[\theta^{(1,c)}, \theta^{(2,c)}, \ldots, \theta^{(j,c)}, \ldots, \theta^{(Ns,c)}]$, where j=1, 2, ..., $N_s$, $\theta^{(j,c)}$ is intermediate model parameter matrx j, according to the likelihood weight coefficient of the prior parameter values and the prior parameters, and carrying out random sampling based on the intermediate parameter matrix and the variance matrix Ei of the proposal distribution to obtain $N_s$ candidate values $\theta^{cc}=[\theta^{(1,cc)}, \theta^{(2,cc)}, \ldots, \theta^{(j,cc)}, \ldots, \theta^{(Ns,cc)}]$, j=1, 2, ..., $N_s$, $\theta^{(j,cc)}$ is candidate value matrix j; if $\theta^{(j,cc)}$ goes beyond the range of prior distribution, reducing $\Sigma_i$ by 2 times and resampling to obtain $\theta^{(j,cc)}$ and then calculating the likelihood values $g(Y|\theta^{(j,c)})$ and $g(Y|\theta^{(j,cc)})$ of the intermediate parameters and the candidate values, respectively;

(6) generating a random value u from [0,1], and if $$u \le \frac{g(Y|\theta^{(j,cc)})}{g(Y|\theta^{(j,c)})},$$

setting $\theta^{(j)}=\theta^{(j,cc)}$; otherwise, setting $\theta^{(j)}=\theta^{(j,c)}$;

(7) updating $C_{max}$, $g$, $w_{(i,j)}$ and $S_i$; and (8) setting i=i+1, and if $q_{i-1} \ge 1$, setting $q_{i-1}=1$; repeating steps (4)-(7), starting a new iteration, calculating S and then ending the iteration; if $q_{i-1} \le 1$, then returning to step (4).

Further, in step (1), the iteration number $N_s$ each stage is 100, the value of difference constant c is between (60) and ln(70), and the value of exponential constant α is between 0.06 and 0.1; the important parameter matrix θ is determined by parameters having a greater impact on the model which are selected by sensitivity analysis; the prior distribution π(θ) of model parameters is obtained from industry norms, journal papers and test data; the number of sensors and the response of measuring points depend on the test data and the number of measuring points concerned by the user; the form of likelihood function is expressed as:

$$g(Y|\theta) = \frac{1}{\sqrt{(2\pi)^{N_y}}} e^{-\left(\frac{(Y-\overline{Y})^T(Y-\overline{Y})}{2C_{max}^2}\right)}$$

where $\overline{Y}$ represents the measuring point response matrix of simulation data, Y represents the measuring point response matrix of test; $C_{max}$ represents the difference constant, given by the likelihood of prior sampling; T represents a transpose symbol.

Further, the variance constant in step (3) is expressed as:

$$C_{cov} = \frac{\sigma(g_{correct}(Y|\theta))\sum_{j=1}^{N_s} D(g_{correct}(Y|\theta^{(j)}))}{\sum_{j=1}^{N_s}(g_{correct}(Y|\theta^{(j)}))^\alpha}$$

$$q_i = \underset{q_i}{\operatorname{argmin}}\left(\left|\sum_{j=1}^{N_s} g(Y|\theta^{(j)})^{q_i-q_{i-1}} - C_{cov}\right|\right)$$

$$g_{correct}(Y|\theta^{(j)}) = \begin{cases} g(Y|\theta^{(j)}) & g(Y|\theta^{(j)}) - \max(g(Y|\theta)) < c \\ \text{pass} & \text{else} \end{cases}$$

where, σ represents variance; $g_{correct}$ represents the value of the likelihood function for a particular condition; a is an exponential constant; the suitable $q_i$ is found according to $N_s$ parameter values; if the parameter values of these sets are worse, $q_i$ is $$\underset{q_i}{\operatorname{argmin}}$$

represents the value of $q_i$ when the parameter values are worst.

Further, the maximum difference in step (3) is expressed as:

$$C_{max} = \min\left(\frac{\max(y_1 - \overline{y}_1, y_2 - \overline{y}_2, \ldots, y_k - \overline{y}_k, \ldots, y_{N_y} - \overline{y}_{N_y})}{3}, C_{max}^{last}\right)$$

where k=1, 2, ..., $N_y$; $y_k$ represents the measured value of the measuring point k; $\overline{y}_k$ represents the simulated value of the measuring point k; $C_{max}^{last}$ represents the $C_{max}$ of last iteration; and if it is the first iteration, this parameter is not considered.

Further, the likelihood weight coefficient $w_{(i,j)}$ of each set of prior parameter values in step (3) is expressed as:

$$w_{(i,j)} = \frac{\pi(\theta^{(j)})g(Y|\theta^{(j)})^{q_i}}{\pi(\theta^{(j)})g(Y|\theta^{(j)})^{q_{i-1}}} = g(Y|\theta^{(j)})^{q_i-q_{i-1}}$$

Further, the mean value Si of the likelihood weight coefficient of prior parameters in step (3) is expressed as:

$$S_i = \frac{1}{N_s}\sum_{j=1}^{N_s} w_{(i,j)}$$

Further, the variance matrix Et of the proposal distribution in step (4) is expressed as:

$$\sum_i = \beta_i^2 \sum_{j=1}^{N_s} \frac{w_{(i,j)}}{S_i N_s}(\theta^{(j)} - \overline{\theta})(\theta^{(j)} - \overline{\theta})^T$$

$$\overline{\theta} = \frac{\sum_{j=1}^{N_s} w_{(i,j)}\theta^{(j)}}{\sum_{j=1}^{N_s} w_{(i,j)}}$$

$$\beta_i = \begin{cases} 2.4/\sqrt{nn} & i = 1 \\ e^{ca}\beta_{i-1} & i > 1 \end{cases}$$

$$t_{acr} = \frac{0.21}{nn} + 0.23$$

$$Ca = \frac{(p_{acr} - t_{acr})}{\sqrt{N_{adapt}}}$$

where, $\beta_i$ represents a scale parameter; $\overline{\theta}$ represents the mean matrix of $N_s$ prior parameters; $N_{adapt}$ represents an increasing constant, the value of first iteration is 1, and the value is increased by 1 for each additional iteration; $p_{acr}$ represents the acceptance rate of candidate values; $t_{acr}$ represents the target acceptance rate of candidate values; nn represents the number of parameters involved in updating of the model parameters.

Further, in step (7), the maximum difference $C_{max}$, the likelihood function g, the likelihood weight $w_{(i,j)}$, and the mean value Si of likelihood weight are updated at the end of each iteration.

Further, in step (8), when $q_{i-1} \ge 1$, let $q_{i-1}=1$, the posterior distribution of model parameters is obtained after one more iteration, and the weight value of likelihood is given by:

$$S = \prod_{i=1}^{mm} S_i$$

where, it is assumed that the final i=mm, $q_{i-1} \ge 1$, that is, the iteration ends.

Beneficial effects: Compared with the prior art, the present invention has the following significant advantages: by setting the number of each iteration, the values of difference constant and exponential constant, and in combination with the proposed likelihood function, the present invention adaptively finds the most probable distribution of structural algorithm coefficients, thereby further providing guidance for the health detection of complex engineering structures. It overcomes the limitations of previous studies, such as the need to obtain suitable algorithm coefficients through multiple iterations and the lack of good adaptive likelihood function forms. By comprehensively utilizing the data in iterations, algorithm parameters and likelihood function forms suitable for different complex engineering models are adaptively found, thereby achieving more adaptive model updating, reducing calculation time, and improving the efficiency of the algorithm.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The technical solution of the invention is further described below in conjunction with the accompanying drawings.

Figure 1:
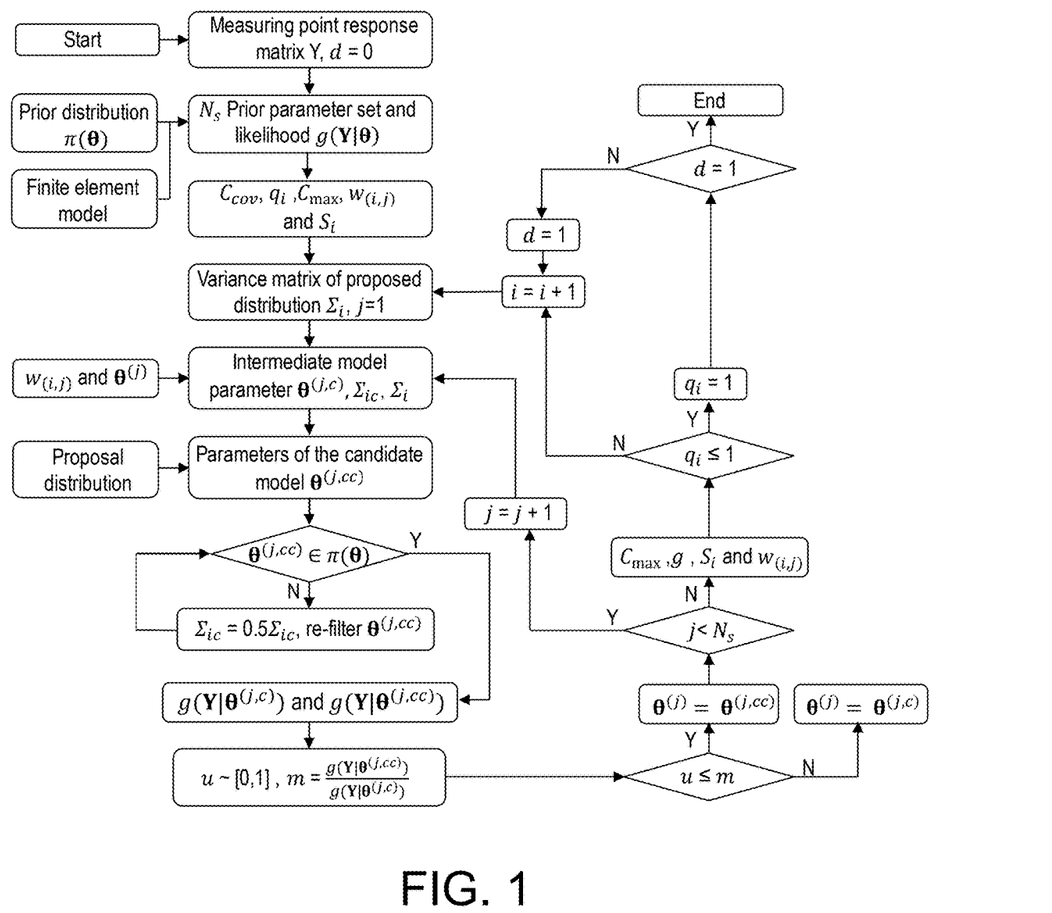
FIG. 1 shows a flow chart of the present invention.

As shown in FIG. 1, the present invention comprises the following steps:

1) setting the iteration stage of the algorithm as i, the number of iterations each stage as $N_s$, difference constant as c, exponential constant as a, likelihood function as g, the important parameter matrix of model as $\theta=[\theta_1, \theta_2, \ldots, \theta_{ii}, \ldots, \theta_n]$, where ii=a 1,2, ..., n, $\theta_{ii}$ is important parameter ii, the prior distribution of model parameters as $\pi(\theta)$, the number of measuring points as $N_y$ and a measuring point response matrix of test as $Y=y_1, y_2, \ldots, y_{jj}, \ldots, y_{N_y}]$, where jj=1, 2, ..., $N_y$, $y_{jj}$ is response of measuring point jj, and $q_0=0$;

wherein i does not need to be set by the user; in step (1), the number $N_s$ of iterations each time is 1, the value of difference constant c is between ln(60) and ln(70), and the value of exponential constant $\alpha$ is between 0.06 and 0.1; the important parameter matrix $\theta$ is determined by parameters having a greater impact on the model which are selected by sensitivity analysis; the prior distribution $\pi(\theta)$ of model parameters is obtained from industry norms, journal papers and test data; the number of sensors and the response of measuring points depend on the test data and the number of measuring points concerned by the user; the form of likelihood function is expressed as:

$$g(Y|\theta) = \frac{1}{\sqrt{(2\pi)^{N_y}}} e^{-\left(\frac{(Y-\overline{Y})^T(Y-\overline{Y})}{2C_{max}^2}\right)}$$

where $\overline{Y}$ represents the measuring point response matrix of simulation data, Y represents the measuring point response matrix of test; $C_{max}$ represents the difference constant, given by the likelihood of prior sampling; T represents a transpose symbol;

(2) setting i=1, randomly sampling $N_s$ prior parameter matrices $\theta=[\theta^{(1)}, \theta^{(2)}, \ldots, \theta^{(N_s)}]$, where j=1, 2, ..., $N_s$, $\theta^{(j)}$ is prior parameter matrix j, from the prior distribution $\pi(\theta)$ of model parameters, and calculating the likelihood values of corresponding model prior parameters;

(3) calculating the variance constant $C_{cov}$, $q_i$ and the maximum difference $C_{max}$, as well as the likelihood weight coefficient $w_{(i,j)}$ of each set of prior parameter values under total iteration i and the mean value Si of weight coefficient;

wherein the variance constant is expressed as:

$$C_{cov} = \frac{\sigma(g_{correct}(Y|\theta))\sum_{j=1}^{N_s} D(g_{correct}(Y|\theta^{(j)}))}{\sum_{j=1}^{N_s}(g_{correct}(Y|\theta^{(j)}))^\alpha}$$

$$q_i = \underset{q_i}{\operatorname{argmin}}\left(\left|\sum_{j=1}^{N_s} g(Y|\theta^{(j)})^{q_i-q_{i-1}} - C_{cov}\right|\right)$$

$$g_{correct}(Y|\theta^{(j)}) = \begin{cases} g(Y|\theta^{(j)}) & g(Y|\theta^{(j)}) - \max(g(Y|\theta)) < c \\ \text{pass} & \text{else} \end{cases}$$

where, $\sigma$ represents variance; $g_{correct}$ represents the value of the likelihood function for a particular condition; $\alpha$ is an exponential constant; the suitable $q_i$ is found according to $N_s$ parameter values; if the parameter values of these sets are worse, $q_i$ is small; argmin represents the value of $q_i$ when the parameter values are worst;

the maximum difference is expressed as:

$$C_{max} = \min\left(\frac{\max(y_1-\overline{y}_1, y_2-\overline{y}_2, \ldots, y_k-\overline{y}_k, \ldots, y_{N_y}-\overline{y}_{N_y})}{3}, C_{max}^{last}\right)$$

where k=1, 2, ..., $N_y$; $y_k$ represents the measured value of the measuring point k; $\overline{y}_k$ represents the simulated value of the measuring point k; $C_{max}^{last}$ represents the $C_{max}$ of last iteration; and if it is the first iteration, this parameter is not considered;

the likelihood weight coefficient w (i,j) of each set of prior parameter values is expressed as:

$$w_{(i,j)} = \frac{\pi(\theta^{(j)})g(Y|\theta^{(j)})^{q_i}}{\pi(\theta^{(j)})g(Y|\theta^{(j)})^{q_{i-1}}} = g(Y|\theta^{(j)})^{q_i-q_{i-1}}$$

The mean value of the likelihood weight coefficient Si of prior parameter values is expressed as:

$$S_i = \frac{1}{N_s}\sum_{j=1}^{N_s} w_{(i,j)}$$

(4) calculating the variance matrix $\Sigma_i$ of the proposal distribution;

wherein the variance matrix $\Sigma_i$ of the proposal distribution is expressed as:

$$\sum_i = \beta_i^2 \sum_{j=1}^{N_s} \frac{w_{(i,j)}}{S_i N_s}(\theta^{(j)} - \bar{\theta})(\theta^{(j)} - \bar{\theta})^T$$

$$\bar{\theta} = \frac{\sum_{j=1}^{N_s} w_{(i,j)}\theta^{(j)}}{\sum_{j=1}^{N_s} w_{(i,j)}}$$

$$\beta_i = \begin{cases} 2.4/\sqrt{nn} & i = 1 \\ e^{ca}\beta_{i-1} & i > 1 \end{cases}$$

$$t_{acr} = \frac{0.21}{nn} + 0.23$$

$$Ca = \frac{(p_{acr} - t_{acr})}{\sqrt{N_{adapt}}}$$

where, $\beta_i$ represents a scale parameter; $\bar{\theta}$ represents the mean matrix of $N_s$ prior parameters; $N_{adapt}$ represents an increasing constant, the value of first iteration is 1, and the value is increased by 1 for each additional iteration; $p_{acr}$ represents the acceptance rate of candidate values; $t_{acr}$ represents the target acceptance rate of candidate values; nn represents the number of parameters involved in updating of the model parameters;

(5) generating an intermediate model parameter matrix $\theta^c = [\theta^{(1,c)}, \theta^{(2,c)}, \ldots, \theta^{(j,c)}, \ldots, \theta^{(Nsc)}]$, where j=1, 2, ..., $N_s$, $\theta^{(j,c)}$ is intermediate model parameter matrx j, according to the likelihood weight coefficient of the prior parameter values and the prior parameters, and carrying out random sampling based on the intermediate parameter matrix and the variance matrix Ei of the proposal distribution to obtain $N_s$ candidate values $\theta^{cc} = [\theta^{(1,cc)}, \theta^{(2,cc)}, \ldots, \theta^{(j,cc)}, \ldots, \theta^{(Ns,cc)}]$, j=1, 2, ..., $N_s$, $\theta^{(j,cc)}$ is candidate value matrix j; if $\theta^{(j,cc)}$ goes beyond the range of prior distribution, reducing $\Sigma_i$ by 2 times and resampling to obtain $\theta^{(j,cc)}$ and then calculating the likelihood values $g(Y|\theta^{(j,c)})$ and $g(Y|\theta^{(j,cc)})$ of the intermediate parameters and the candidate values, respectively; wherein during the generation of the intermediate model parameters, if the likelihood weight of the prior model parameters is relatively large, the values of the generated intermediate model parameters are larger. The number of intermediate model parameter values that are the same as the prior model parameter values is $$N(\theta^{(j)}) = \frac{N_s w_{(i,j)}}{\sum_{j=1}^{N_s} w_{(i,j)}}.$$

The intermediate model parameters are taken as the mean value and the variance matrix of the proposed distribution is taken as the normal distribution of the variance to generate the candidate values.

(6) generating a random value u from [0,1], and if $$u \le \frac{g(Y|\theta^{(j,cc)})}{g(Y|\theta^{(j,c)})},$$

setting $\theta^{(j)} = \theta^{(j,cc)}$; otherwise, setting $\theta^{(j)} = \theta^{(j,c)}$;

(7) updating $C_{max}$, g, $w_{(i,j)}$ and $S_i$, wherein the maximum difference $C_{max}$, the likelihood function g, the likelihood weight $w_{(i,j)}$, and the mean value $S_i$ of likelihood weight are updated at the end of each iteration; and (8) setting i=i+1, and if $q_{i-1} \ge 1$, setting $q_{i-1} = 1$; repeating steps (4)-(7), starting a new iteration, calculating S and then ending the iteration; if $q_{i-1} \le 1$, then returning to step (4);

wherein when $q_{i-1} \ge 1$, let $q_{i-1} = 1$, the posterior distribution of model parameters is obtained after one more iteration, and the weight value of likelihood is given by:

$$S = \prod_{i=1}^{mm} S_i$$

where, it is assumed that the final i=mm, $q_{i-1} \ge 1$, that is, the iteration ends.

Figure 2:
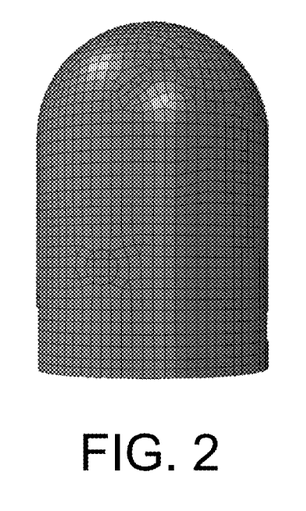
FIG. 2 shows a finite element model of a prestressed concrete containment.

Taking a prestressed concrete containment as an example, FIG. 2 shows a finite element model of the prestressed concrete containment. In this example analysis, there are 5 important parameters of the prestressed concrete containment model, and the mean and variance of their distributions are shown in Table 1.

TABLE 1

Parameter distribution of prestressed concrete containment

| Material | Symbol | Mean | Difference coefficient | Distribution type |
|---|---|---|---|---|
| Tensile strength of concrete | $f_{ct}$ | 3.6 MPa | 15% | Normal distribution |
| Yield strength of rebar | $f_{yr}$ | 500 MPa | 8% | Lognormal distribution |
| Yield strength of steel lining | $f_{cl}$ | 400 MPa | 8% | Lognormal distribution |
| Yield strength of Prestressed tendon | $f_{yp}$ | 1580 MPa | 8% | Lognormal distribution |
| Strain hardening index of prestressed tendon | $k_p$ | 0.03 | 20% | Lognormal distribution |

In addition, let the iteration number of each stage $N_s = 100$, the difference constant c=ln(70), the exponential constant $\alpha = 0.10$, and the internal pressure of the containment is increased from 0 MPa to 1.42 MPa, and 15 points of functional failure (1.29 MPa) and structural failure (1.42 MPa) of the containment are selected to form a measuring point response Y. The location distribution of 15 measuring points and 30 measuring point numbers are shown in Table 2 Location distribution of 15 measuring points and 30 measuring point numbers.

TABLE 2

Location distribution of 15 measuring points and 30 measuring point numbers

| Measuring point | Angle (degree) | Height (mm) | 1.29 MP measuring point number | 1.42 MPa measurement point number |
|---|---|---|---|---|
| P1 | 135 | 10750 | C1 | C16 |
| P2 | 135 | 7730 | C2 | C17 |
| P3 | 135 | 6200 | C3 | C18 |
| P4 | 135 | 4680 | C4 | C19 |
| P5 | 135 | 2630 | C5 | C20 |
| P6 | 324 | 1430 | C6 | C21 |
| P7 | 324 | 10750 | C7 | C22 |

TABLE 2-continued

Location distribution of 15 measuring points and 30 measuring point numbers

| Measuring point | Angle (degree) | Height (mm) | 1.29 MP measuring point number | 1.42 MPa measurement point number |
|---|---|---|---|---|
| P8 | 324 | 7730 | C8 | C23 |
| P9 | 324 | 6200 | C9 | C24 |
| P10 | 324 | 4680 | C10 | C25 |
| P11 | 334 | 4680 | C11 | C26 |
| P12 | 270 | 4680 | C12 | C27 |
| P13 | 240 | 4680 | C13 | C28 |
| P14 | 180 | 4680 | C14 | C29 |
| P15 | 90 | 4680 | C15 | C30 |

Figure 3:
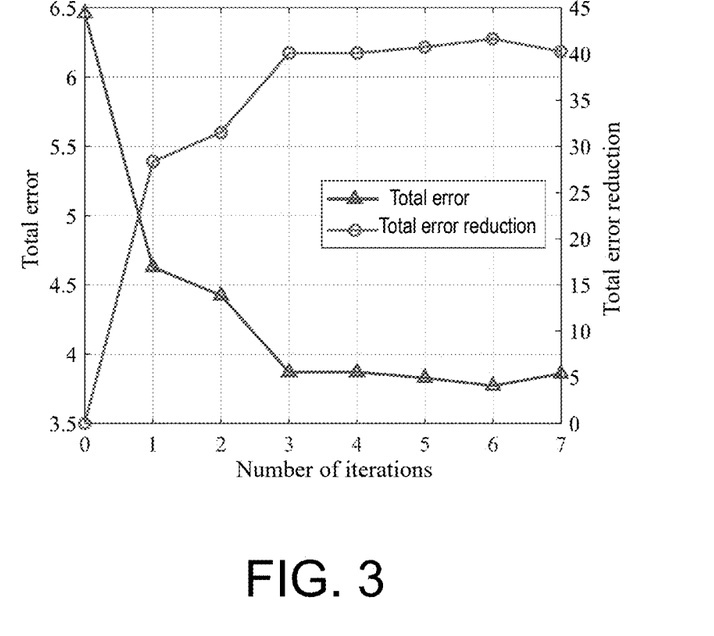
FIG. 3 shows the variation of the minimum total error of 30 measuring points in an iteration process.
Figure 4:
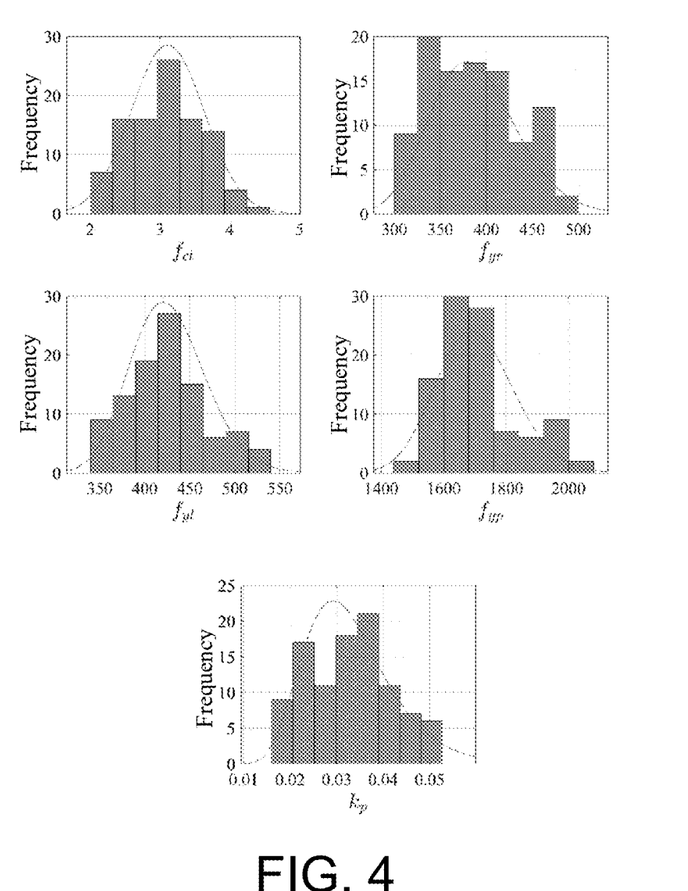
FIG. 4 shows the frequency histograms and fitting results of parameters after model updating.
Figure 5:
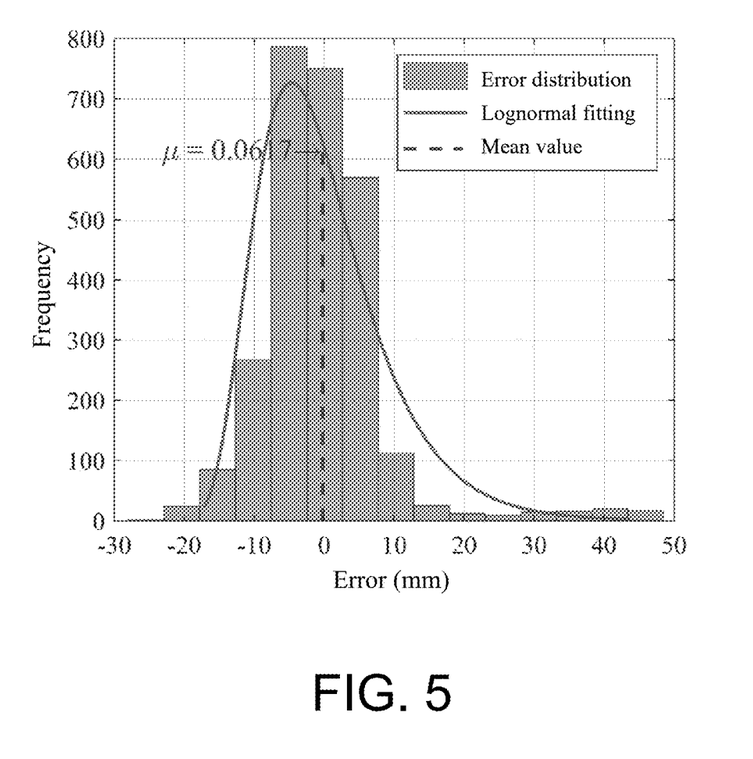
FIG. 5 shows the error distribution of 30 measuring points in the iteration process.

After the above values are defined, the algorithm starts to run automatically. The algorithm is finished after 7 iterations, and the total error of the updated optimal parameters is 3.858 mm, which is 40.26% lower than the total error of 6.458 mm before iteration. FIG. 3 shows the variation of the minimum overall error values of 30 measuring points found in each iteration during the process of parameter iterations. FIG. 4 shows the frequency histograms and fitting results of parameters after model updating. 95% confidence intervals of parameter distributions obtained by fitting in FIG. 4 were taken, 100 sets of parameter values are randomly filtered, and the error distributions of 30 measuring points are obtained, as shown in FIG. 5. In summary, based on the prior distribution of parameters, the error of the optimal parameters found after the algorithm iteration is reduced by about 40% compared with that before the update. The mean value of the error of the measurement points randomly generated by the updated posterior distribution of parameters is also close to 0, which proves the efficiency of the algorithm in updating model parameters of complex structures, thereby providing guidance for the subsequent health detection of complex engineering structures.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A computer-implemented method for probabilistic health monitoring of complex engineering structures executed by at least one processor operatively coupled to a plurality of sensors, comprising the following steps:

a data collecting step comprising: acquiring response data from the sensors positioned at measuring points on the complex engineering structure, wherein the response data corresponds to structural responses under loading conditions; and a plurality of processing steps (1) to (8);

(1) initializing algorithm parameters including the iteration stage of the algorithm as i, the iteration number each stage as $N_s$, difference constant as c, exponential constant as $\alpha$, likelihood function as g, the important parameter matrix of a model as $\theta=[\theta_1, \theta_2, \ldots, \theta_{ii}, \ldots, \theta_n]$, where ii=1, 2, ..., n, $\theta_{ii}$ is important parameter ii representing structural parameters determined by sensitivity analysis, the prior distribution of model parameters as $\pi(\theta)$, a proposal distribution for generating candidate parameter values, the number of measuring points as $N_y$ and a measuring point response matrix of test as $Y=[y_1, y_2, \ldots, y_{jj}, \ldots, y_{Ny}]$, where jj=1, 2, ..., $N_y$, $y_{jj}$ is response of measuring point jj, and $q_0=0$;

(2) setting i=1, randomly sampling $N_s$ prior parameter matrices $0=[\theta^{(1)}, \theta^{(2)}, \ldots, \theta^{(j)}, \ldots, \theta^{(N_s)}]$, where j=1, 2, ..., $N_s$, $\theta^{(j)}$ is prior parameter matrix j, from the prior distribution $\pi(\theta)$ of model parameters, and calculating the likelihood values of corresponding prior parameter values using a finite element model stored in memory;

(3) calculating adaptive algorithm parameters including a variance constant $C_{cov}$, a transition parameter $q_i$, a maximum difference $C_{max}$ based on comparison between measured and simulated responses, likelihood weight coefficients $w_{(i,j)}$ for each set of prior parameter values, and a mean value Si of the likelihood weight coefficients $w_{(i,j)}$ to overcome coefficient determination challenges in traditional Bayesian updating methods and reduce computation time for finite element models of complex engineering structures;

(4) calculating a variance matrix $\Sigma_i$ of the proposal distribution that adaptively adjusts based on weighted covariance of current parameter values;

(5) generating an intermediate model parameter matrix based on likelihood weight coefficients $w_{(i,j)}$ of prior parameter values, performing random sampling using the intermediate parameter matrix and the variance matrix $\Sigma_i$ of the proposal distribution to obtain candidate parameter values, constraining candidate values within the prior distribution range by reducing the variance matrix by a factor of 2 and resampling when candidate values exceed the prior distribution boundaries to ensure engineering feasibility and prevent unrealistic parameter combinations, and calculating likelihood values for both intermediate parameters and candidate values using the finite element model;

(6) performing an acceptance-rejection decision by generating a random value u from [0,1] and comparing u with a likelihood ratio to determine whether to accept the candidate parameter values or retain intermediate parameter values;

(7) updating algorithm parameters including the maximum difference $C_{max}$, likelihood function values g, likelihood weight coefficients $w_{(i,j)}$, and mean value Si based on current iteration results; and (8) controlling iteration flow by incrementing the iteration stage i, evaluating convergence conditions based on the transition parameter $q_{i-1}$, repeating steps (4) through (8) for continued iteration when $q_{i-1} \leq 1$, and terminating the algorithm when $q_{i-1} \geq 1$ to achieve automatic convergence determination for complex engineering structure health detection applications and obtain posterior distribution of model parameters for engineering structure safety assessment and health monitoring.

2. The computer-implemented method for probabilistic health monitoring of complex engineering structures according to claim 1, wherein the maximum difference in step (3) is expressed as:

$$C_{max} = \min\left(\frac{\max(y_1 - \bar{y}_1, y_2 - \bar{y}_2, \ldots, y_k - \bar{y}_k, \ldots, y_{N_y} - \bar{y}_{N_y})}{3}, C_{max}^{last}\right)$$

where k=1, 2, ..., $N_y$; $y_k$ represents the measured value of the measuring point k; $\bar{y}_k$ represents the simulated value of the measuring point k; $C_{max}^{last}$, represents the $C_{max}$ of last iteration; and if it is the first iteration, this parameter is not considered.

3. The computer-implemented method of claim 1, wherein the likelihood weight coefficient $w_{(i,j)}$ of each set of prior parameter values in step (3) is expressed as:

$$w_{(i,j)} = \frac{\pi(\theta^{(j)})g(Y|\theta^{(j)})^{q_i}}{\pi(\theta^{(j)})g(Y|\theta^{(j)})^{q_{i-1}}} = g(Y|\theta^{(j)})^{q_i - q_{i-1}}.$$

4. The computer-implemented method of claim 1, wherein the mean value $S_i$ of the likelihood weight coefficient of prior parameters in step (3) is expressed as:

$$S_i = \frac{1}{N_s}\sum_{j=1}^{N_s} w_{(i,j)}.$$

5. The computer-implemented method of claim 1, wherein the variance matrix $\Sigma_i$ of the proposal distribution in step (4) is expressed as:

$$\Sigma_i = \beta_i^2 \sum_{j=1}^{N_s} \frac{w_{(i,j)}}{S_i N_s}(\theta^{(j)} - \bar{\theta})(\theta^{(j)} - \bar{\theta})^T$$

$$\bar{\theta} = \frac{\sum_{j=1}^{N_s} w_{(i,j)}\theta^{(j)}}{\sum_{j=1}^{N_s} w_{(i,j)}}$$

$$\beta_i = \begin{cases} 2.4/\sqrt{nn} & i = 1 \\ e^{ca}\beta_{i-1} & i > 1 \end{cases}$$

$$t_{acr} = \frac{0.21}{nn} + 0.23$$

$$Ca = \frac{(p_{acr} - t_{acr})}{\sqrt{N_{adapt}}}$$

where, $\beta_i$ represents a scale parameter; $\bar{\theta}$ represents the mean matrix of $N_s$ prior parameters; $N_{adapt}$ represents an increasing constant, the value of first iteration is 1, and the value is increased by 1 for each additional iteration; $p_{acr}$ represents the acceptance rate of candidate values; $t_{acr}$ represents the target acceptance rate of candidate values; nn represents the number of parameters involved in updating of the model parameters.

6. The computer-implemented method of claim 1, wherein in step (7), the maximum difference $C_{max}$, the likelihood function g, the likelihood weight $w_{(i,j)}$, and the mean value $S_i$ of likelihood weight are updated at the end of each iteration.

7. The computer-implemented method of claim 1, wherein in step (8), when $q_{i-1} \geq 1$, let $q_{i-1}=1$, the posterior distribution of model parameters is obtained after one more iteration, and the weight value of likelihood is given by:

$$S = \prod_{i=1}^{mm} S_i$$

where, it is assumed that the final i=mm, $q_{i-1} \geq 1$, that is, the iteration ends.

8. The computer-implemented method of claim 1, wherein the iteration number $N_s$ per stage is 100, the difference constant c is between ln(60) and ln(70), the exponential constant $\alpha$ is between 0.06 and 0.1, and the important parameter matrix $\theta$ is determined by parameters selected by sensitivity analysis.

9. The computer-implemented method of claim 1, wherein the likelihood function g is expressed as:

$$g(Y|\theta) = \frac{1}{\sqrt{(2\pi)^{N_y}}} e - \left(\frac{(Y - \bar{Y})^T(Y - \bar{Y})}{2C_{max}^2}\right)$$

where $\bar{Y}$ represents the measuring point response matrix of simulation data, Y represents the measuring point response matrix of test; $C_{max}$ represents the difference constant, given by the likelihood of prior sampling; T represents a transpose symbol.

10. The computer-implemented method of claim 1, wherein calculating the adaptive algorithm parameters in step (3) comprises:
calculating the variance constant according to $$C_{cov} = \frac{\sigma(g_{correct}(Y|\theta))\sum_{j=1}^{N_s} D(g_{correct}(Y|\theta^{(j)}))}{\sum_{j=1}^{N_s}(g_{correct}(Y|\theta^{(j)}))^\alpha};$$

determining the transition parameter $q_i$ through $$q_i = \underset{q_i}{\mathrm{argmin}}\left(\left|\sum_{j=1}^{N_s} g(Y|\theta^{(j)})^{q_i - q_{i-1}} - C_{cov}\right|\right);$$

and
computing a corrected likelihood function $g_{correct}(Y|\theta^{(j)})$ that equals $g^{(Y|\theta^{(j)})}$ when $g(Y|\theta^{(j)}) - \max(g(Y|\theta)) < c$ and is excluded otherwise, where, $\sigma$ represents variance; $g_{correct}$ represents the value of the likelihood function for a particular condition; $\alpha$ is an exponential constant; the transition parameter $q_i$ is determined by minimizing objective function $$\left|\sum_{j=1}^{N_s} g(Y|\theta^{(j)})^{q_i - q_{i-1}} - C_{cov}\right|$$

based on the $N_s$ parameter values.

11. The computer-implemented method of claim 1, wherein the complex engineering structure is selected from the group consisting of high-rise buildings, long-span bridges, and nuclear power plants.

12. The computer-implemented method of claim 1, wherein the sensors are positioned at different angular positions and height levels on the complex engineering structure to acquire structural response data under predetermined loading conditions for comprehensive health monitoring coverage.

* * * * *

UNITED STATES PATENT AND TRADEMARK OFFICE
CERTIFICATE OF CORRECTION

| | | |
|---|---|---|
| PATENT NO. | : 12,461,988 B1 | Page 1 of 1 |
| APPLICATION NO. | : 19/051126 | |
| DATED | : November 4, 2025 | |
| INVENTOR(S) | : Decheng Feng et al. | |

It is certified that error appears in the above-identified patent and that said Letters Patent is hereby corrected as shown below:

On the Title Page

Item (71) Applicant should read as follows: Southeast University, Jiangsu (CN)
Item (72) Inventors should read as follows: Decheng Feng, Jiangsu (CN); Yuxiao Wu, Jiangsu (CN)

Signed and Sealed this
Twenty-seventh Day of January, 2026

John A. Squires
*Director of the United States Patent and Trademark Office*